United States Patent [19]

Hayes

[11] Patent Number: 5,425,569
[45] Date of Patent: Jun. 20, 1995

[54] VEHICLE SEATBACK WITH LATERAL WINGS

[75] Inventor: Clayton J. Hayes, Romeo, Mich.

[73] Assignee: General Motors Corporation, Detroit, Mich.

[21] Appl. No.: 225,676

[22] Filed: Apr. 11, 1994

[51] Int. Cl.⁶ .......................... A47C 7/02; A47C 7/24; A47C 7/26
[52] U.S. Cl. ............................ 297/452.35; 297/284.9; 297/452.34
[58] Field of Search ........... 297/284.9, 452.34, 452.35, 297/452.36, 452.23, 452.26

[56] References Cited

U.S. PATENT DOCUMENTS

| | | | |
|---|---|---|---|
| 2,619,157 | 11/1952 | Guyton et al. | 155/189 |
| 3,773,382 | 11/1973 | Coursault et al. | 297/284 |
| 4,130,318 | 12/1978 | Hemmen et al. | 297/410 |
| 4,536,030 | 8/1985 | Sakurada et al. | 297/284 |
| 4,537,444 | 8/1985 | Maruyama et al. | 297/284.9 |
| 4,636,000 | 1/1987 | Nishino | 297/284.9 |
| 4,883,318 | 11/1989 | Adachi | 297/284.9 |
| 4,895,412 | 1/1990 | Deley et al. | 297/284 |
| 4,913,491 | 4/1990 | Mizuno et al. | 297/284 |
| 4,938,529 | 7/1990 | Fourrey | 297/284 |
| 5,098,157 | 3/1992 | Surot | 297/250 |
| 5,316,375 | 5/1994 | Breen | 297/284.9 |

Primary Examiner—Peter R. Crown
Assistant Examiner—Anthony Barfield
Attorney, Agent, or Firm—Ernest E. Helms

[57] ABSTRACT

A vehicle seat assembly is provided which, in a preferred embodiment, includes a vehicle seatback frame with at least two spaced-apart rails defining a seating surface therebetween, a flexible seat suspension bridging over and connecting to the spaced-apart rails for supporting the seating surface and including a generally elongated member generally parallel to at least one of the rails, a wire wing reinforcement pivotally mounted at upper and lower ends to the elongated member and extending from the elongated member and having upper stop means and lower means by making contact with the elongated member to limit a maximum angle of the wing reinforcement with respect to the seating surface, and an elastic wing covering the wing reinforcement compliantly returning the wing reinforcement to an angle approximating the maximum angle of the wing reinforcement with respect to the seating surface whenever the wing has been angularly displaced toward the seating surface.

2 Claims, 3 Drawing Sheets

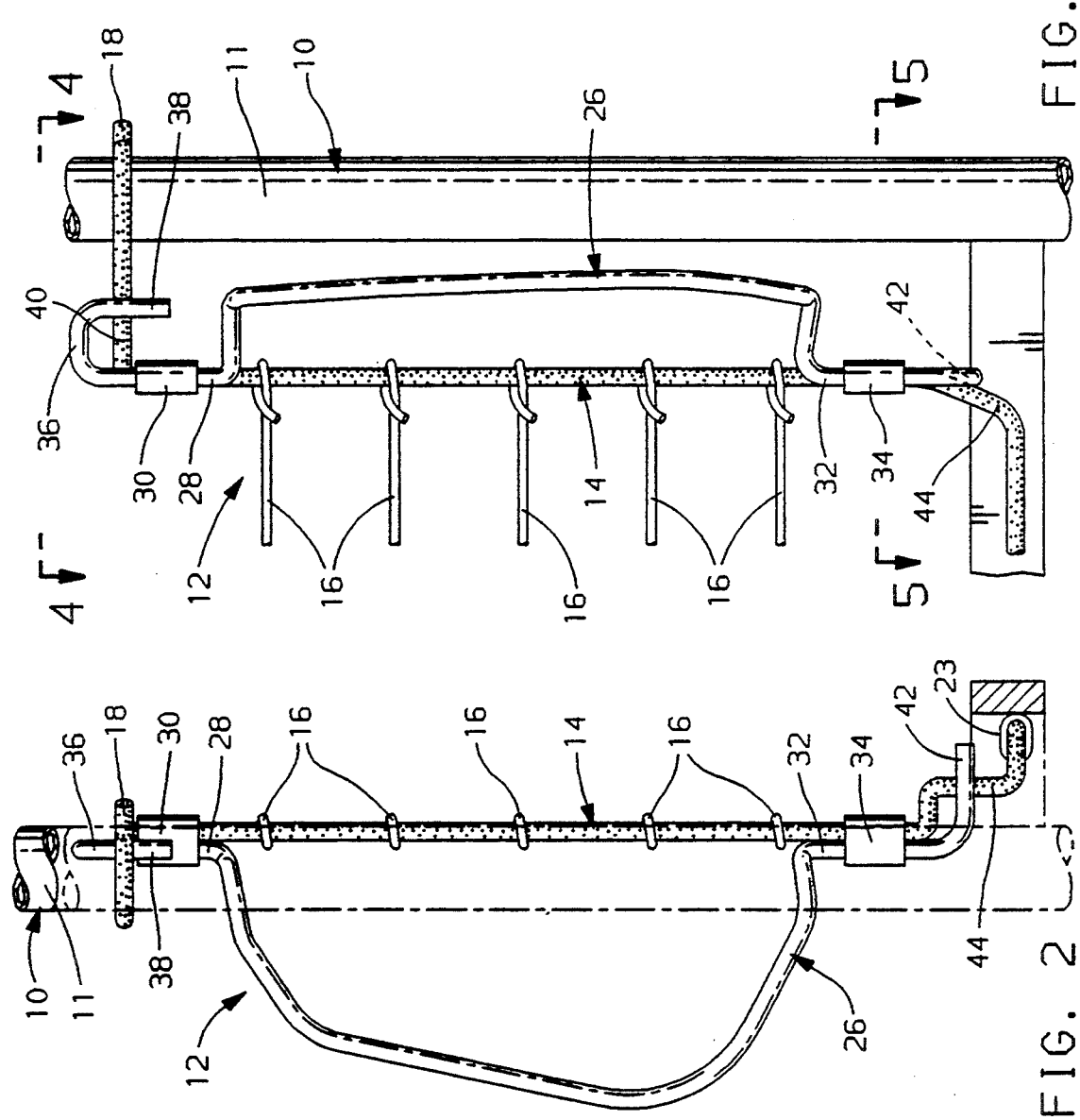
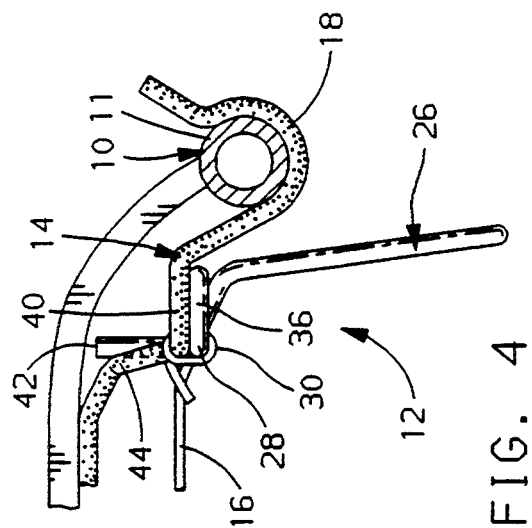
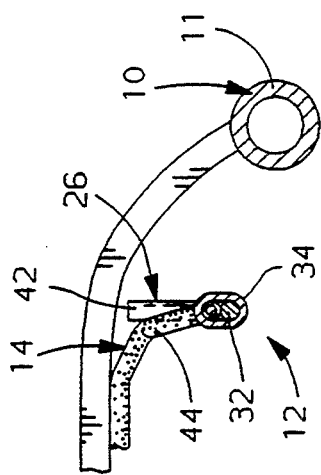

VEHICLE SEATBACK WITH LATERAL WINGS

FIELD OF THE INVENTION

The field of the present invention is that of vehicle seatbacks with lateral wings.

BACKGROUND OF THE INVENTION

It is known in the an to provide seats in vehicles wherein the seatback has lateral wings to give the occupant a snug or hug-around feeling. In order to reinforcement the lateral wings, there is often inserted therein a wire. Typically, this wire is fixably attached to a frame for the vehicle seatback at the wire's extreme ends. In an alternative embodiment, the wire is "floating", meaning that it is simply inserted within the seatback foam bun lateral wing.

Many sports-type vehicles have a relatively low seating position which often causes the vehicle occupant to bend the seatback lateral wing inwardly when entering the vehicle. Repetitive bending of the lateral wing inwardly upon egress of the vehicle may sometimes cause a permanent deformation in the reinforcement wire, thereby resulting in less than optimum comfort and appearance to the vehicle seat operator of the lateral wing.

SUMMARY OF THE INVENTION

The present invention provides a vehicle seatback with lateral rings which are reinforced by a wire reinforcement which is pivotally mounted to the seatback suspension, thereby allowing occupant egress into the vehicle without initiating a permanent set in the reinforcement wire and providing other advantages which will be made apparent to those skilled in the art as the invention is further explained in the accompanying detailed description and drawings.

BRIEF DESCRIPTION OF THE DRAWINGS

FIG. 2 is an enlarged side elevational view of a portion of the vehicle seatback shown in FIG. 1.

FIG. 3 is an enlarged front elevational view of a portion of the vehicle seatback shown in FIG. 1.

FIGS. 4 and 5 are views taken along lines 4—4 and 5—5, respectively, of FIG. 3.

DESCRIPTION OF THE PREFERRED EMBODIMENT

Figure 1:
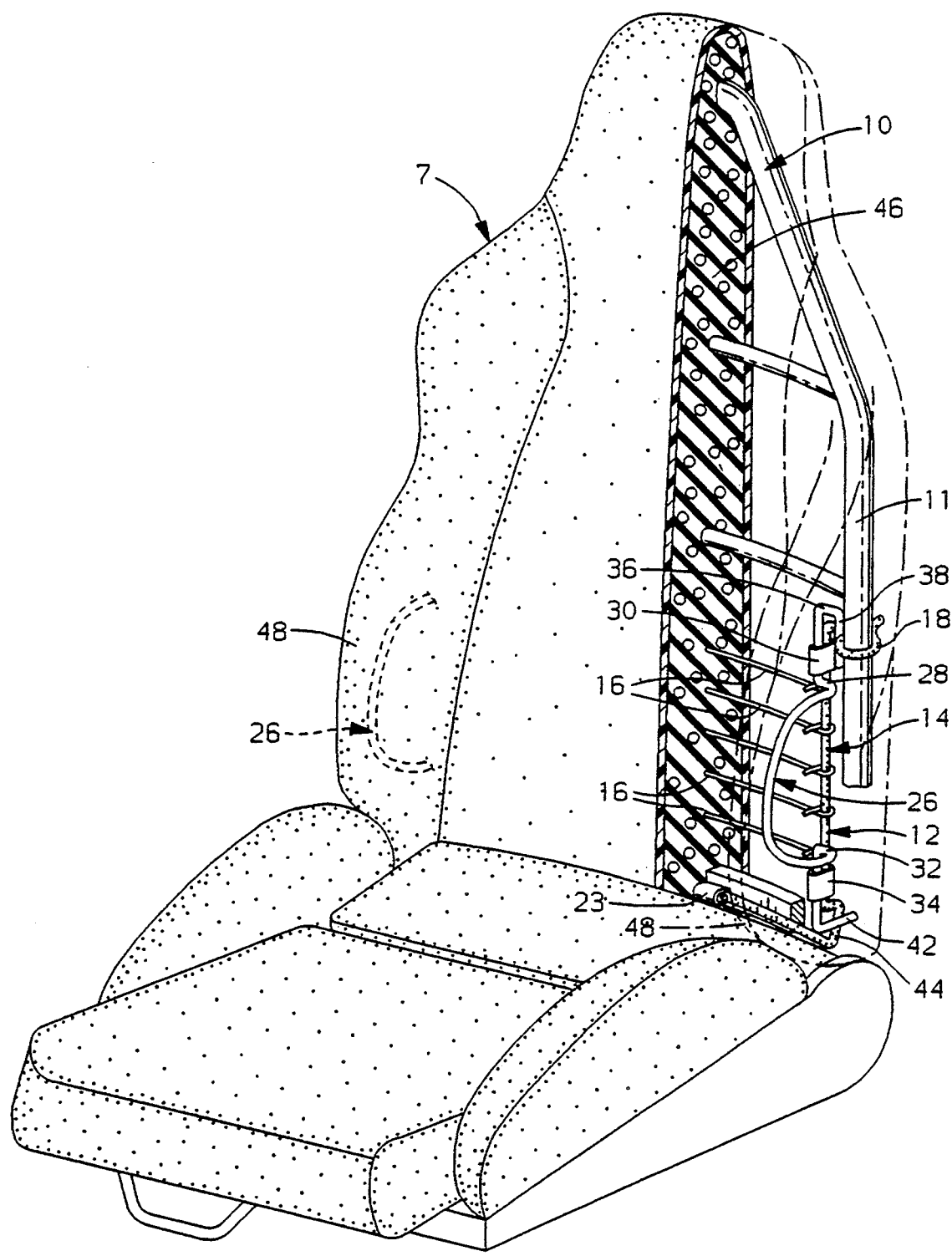
FIG. 1 is a perspective view, partially sectioned, illustrating a preferred embodiment of the present invention.
Figure 6:
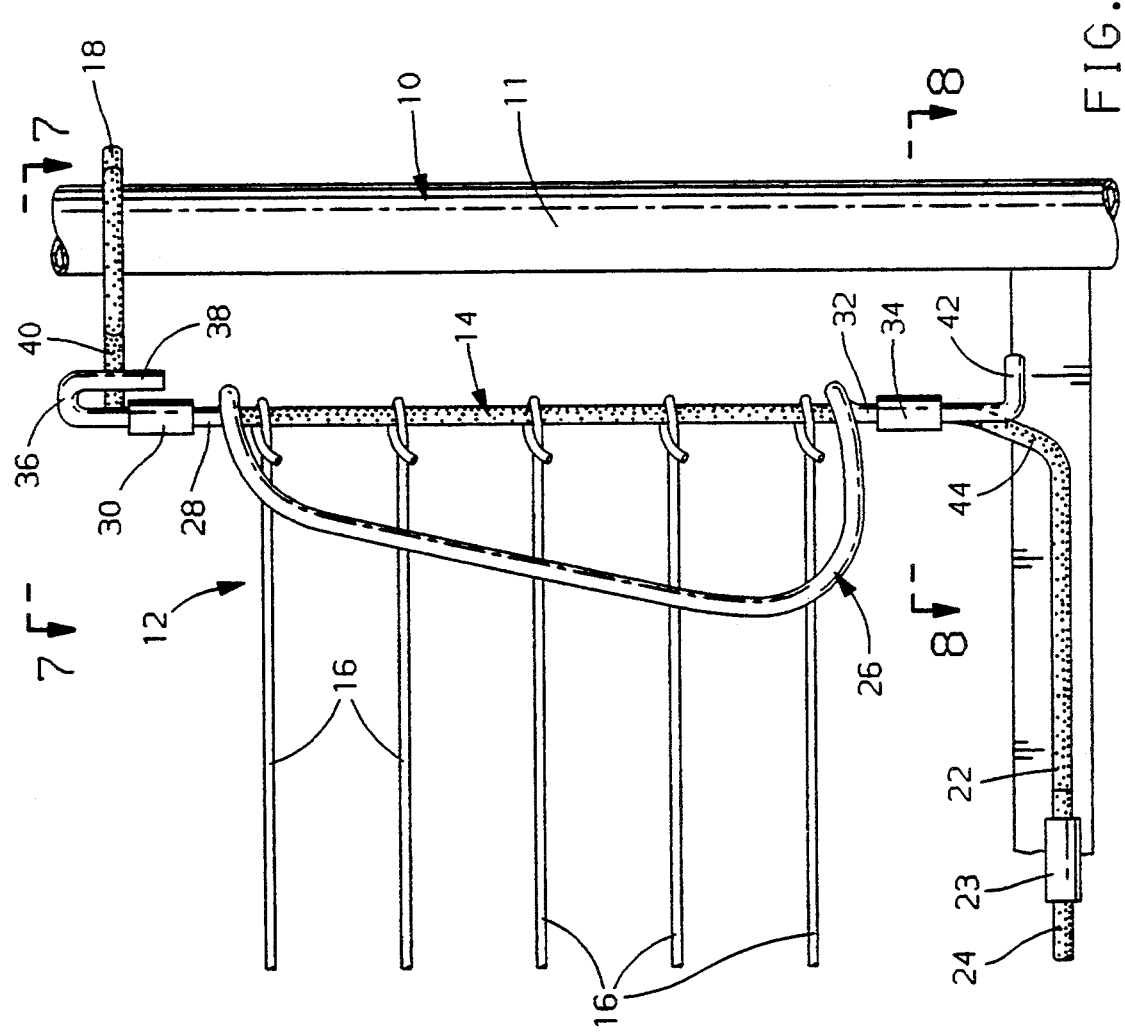
FIG. 6 is a view similar to that of FIG. 3 showing the lateral wing of the vehicle seat being moved to an alternative position to allow egress into a vehicle.

Referring to FIG. 1, a vehicle seatback 7 according to the present invention has a tubular metallic frame 10. The frame is generally symmetrically U-shaped in its total proportion, having two main spaced-apart rails 11 for defining a seating surface therebetween. For supporting the seating surface between the opposing rails 11 of the frame, there is a flexible seat suspension 12. The seat suspension 12 has two generally parallel, elongated members 14 (only one shown in FIG. 1) which generally extend parallel to the rails 11. The elongated members 14 are formed on two separate wires 22 and 24 (as shown in FIG. 6) which are joined by a clamp 23. To connect the seat suspension 12 to the frame rails 11, there is a hook 18. Spanning the elongated parallel members 14 is a series of support cross wires 16 which transmit force from one elongated member 14 to the other. Both of the wires 22 and 24 are enclosed with a polymeric film coating to aid in the connection of cross support wires 16.

Referring additionally to FIGS. 2 through 8, a wing reinforcement wire 26 is pivotally mounted to the elongated member 14 at its upper end 28 by a clamp 30. In similar fashion, the lower end 32 of wing wire reinforcement 26 is pivotally mounted to the elongated member 14 by a clamp 34.

The top portion 28 of the reinforcement has a hook 36 with a descending portion 38. In an extreme angular position with respect to the seating surface (basically defined by a plane containing the cross wires 16), a section 40 of the hook 18 provides a stop for the descending portion 38 of the wire reinforcement. The contact between descending portion 38 and section 40 stresses wires 16 of the suspension 12 in compression.

The lower end 32 of the wing wire reinforcement 26 has a terminal end 42 which contacts a portion 44 of the suspension wire 22. Outward force on the wing wire reinforcement 26 will cause the lower extension 42 to contact portion 44, placing the suspension in an inward force condition (causing the cross wires 16 to bend outwardly in the middle toward a seat occupant).

A polymeric foam cushion 46 which is used for padding of the seat 7 and includes lateral wings 48 is formed in a mold (not shown) wherein the suspension is already placed. A jig in the mold will stress the two reinforcement wing wires 26 outwardly before the foam is shot into the mold. When the foam cushion 46 is trimmed, the cushion 46 in a trimmed state will push outwardly on the wing wire reinforcements 26 and also cause a compressive stress in the cross wires 16.

Figure 7:
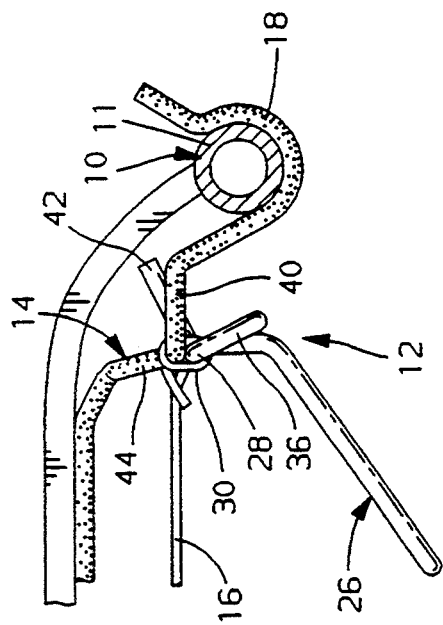
FIGS. 7 and 8 are views taken along lines 7—7 and 8—8, respectively, of FIG. 6.
Figure 8:
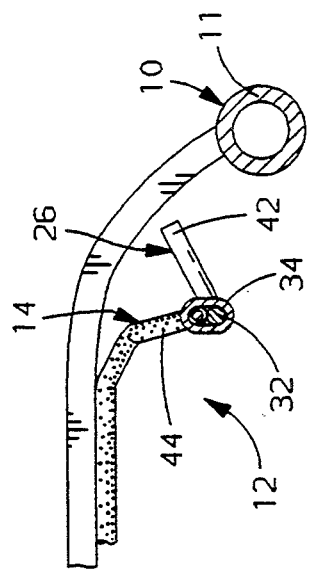

Referring to FIGS. 6, 7 and 8, an occupant entering the seat may deliberately or inadvertently push the wing reinforcement wire 26 (via its outside covering of polymeric foam and seat cushion material) to pivot inwardly toward the cross wires 16.

Upon entry into the seat, polymeric foam and cloth covering will seek to return to its original position, causing the polymer reinforcement wing wire 26 to pivot outwardly to its extreme angular position as previously shown in FIGS. 2 through 5.

One advantage of the present invention is that the stops for the portions 38 and 42 of wing wire reinforcement 26 load a flexible suspension 12 and therefore have compliance. Thus, the wing wire reinforcements 26 are further protected from deformation when being forced outwardly, away from the seating surface.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat assembly comprising:
   a vehicle frame including at least two spaced-apart rails defining a seating surface therebetween;
   a flexible seat suspension bridging over and connecting to the spaced-apart rails for supporting the seating surface, the suspension including a generally elongated member generally parallel to at least one of the rails;

a wire wing reinforcement pivotally mounted at an upper end and a lower end to the elongated member, the wire extending from the elongated member and having upper and lower stops extending from the upper and lower ends respectively for contacting with the elongated member to limit a maximum and minimum angle of the wing reinforcement with respect to the seating surface; and an elastic covering the wing reinforcement for compliantly returning the wing reinforcement to an angle approximating the maximum angle of the wing reinforcement with respect to the seating surface whenever the wing reinforcement has been angularly displaced toward the seating surface.

2. A vehicle seat assembly as described in claim 1 wherein said frame is for a seatback.

* * * * *